US012330532B2

(12) United States Patent
Tsuchida et al.

(10) Patent No.: US 12,330,532 B2
(45) Date of Patent: Jun. 17, 2025

(54) BRAKE CONTROL APPARATUS

(71) Applicants: Hino Motors, Ltd., Tokyo (JP);
TOYOTA JIDOSHA KABUSHIKI KAISHA, Toyota (JP)

(72) Inventors: Kohei Tsuchida, Hino (JP); Suguru Kato, Hino (JP)

(73) Assignees: Hino Motors, Ltd., Tokyo (JP);
TOYOTA JIDOSHA KABUSHIKI KAISHA, Toyota (JP)

(*) Notice: Subject to any disclaimer, the term of this patent is extended or adjusted under 35 U.S.C. 154(b) by 227 days.

(21) Appl. No.: 17/806,849

(22) Filed: Jun. 14, 2022

(65) Prior Publication Data

US 2022/0402368 A1 Dec. 22, 2022

(30) Foreign Application Priority Data

Jun. 16, 2021 (JP) ................................. 2021-099978

(51) Int. Cl.
*B60L 7/18* (2006.01)
*B60L 7/22* (2006.01)
*B60L 7/26* (2006.01)
*B60L 58/15* (2019.01)

(52) U.S. Cl.
CPC ................... *B60L 7/18* (2013.01); *B60L 7/22* (2013.01); *B60L 7/26* (2013.01); *B60L 58/15* (2019.02)

(58) Field of Classification Search
CPC ...... B60L 7/18; B60L 7/22; B60L 7/26; B60L 58/15; B60L 7/24; B60L 7/10; B60W 30/18127
See application file for complete search history.

(56) References Cited

U.S. PATENT DOCUMENTS

| 2012/0133202 A1* | 5/2012 | Mui | B60L 3/10 |
| | | | 303/152 |
| 2014/0324283 A1* | 10/2014 | Kim | B60T 17/22 |
| | | | 701/33.9 |
| 2015/0051767 A1* | 2/2015 | Mohri | B60L 50/66 |
| | | | 180/65.265 |
| 2015/0224981 A1* | 8/2015 | Fujishiro | B60W 20/13 |
| | | | 180/65.265 |
| 2018/0079418 A1* | 3/2018 | Iwasa | B60L 50/16 |

FOREIGN PATENT DOCUMENTS

| CN | 108177639 A | * | 6/2018 | ............. B60T 13/74 |
| EP | 2 896 543 A1 | | 7/2015 | |
| JP | 10-73161 A | | 3/1998 | |

(Continued)

OTHER PUBLICATIONS

Extended European Search Report issued Oct. 27, 2022 in European Patent Application No. 22179157.7, 7 pages.

*Primary Examiner* — Anshul Sood
(74) *Attorney, Agent, or Firm* — Oblon, McClelland, Maier & Neustadt, L.L.P.

(57) ABSTRACT

Provided is a brake control apparatus of an automobile that drives drive wheels by an electric motor to which electric power is supplied from a battery and obtains a braking force by regenerative braking of the electric motor while charging the battery, including: a speed change process unit configured to increase a rotation speed of the electric motor with respect to a rotation speed of the drive wheels when operating the regenerative braking.

4 Claims, 2 Drawing Sheets

(56) References Cited

FOREIGN PATENT DOCUMENTS

| | | |
|---|---|---|
| JP | 2010-16946 A | 1/2010 |
| JP | 2012-035705 A | 2/2012 |
| JP | 2012-205318 A | 10/2012 |
| JP | 2013-106509 A | 5/2013 |
| JP | 2013-207926 A | 10/2013 |
| JP | 2014-101065 | 6/2014 |
| JP | 2020-069817 A | 5/2020 |

\* cited by examiner

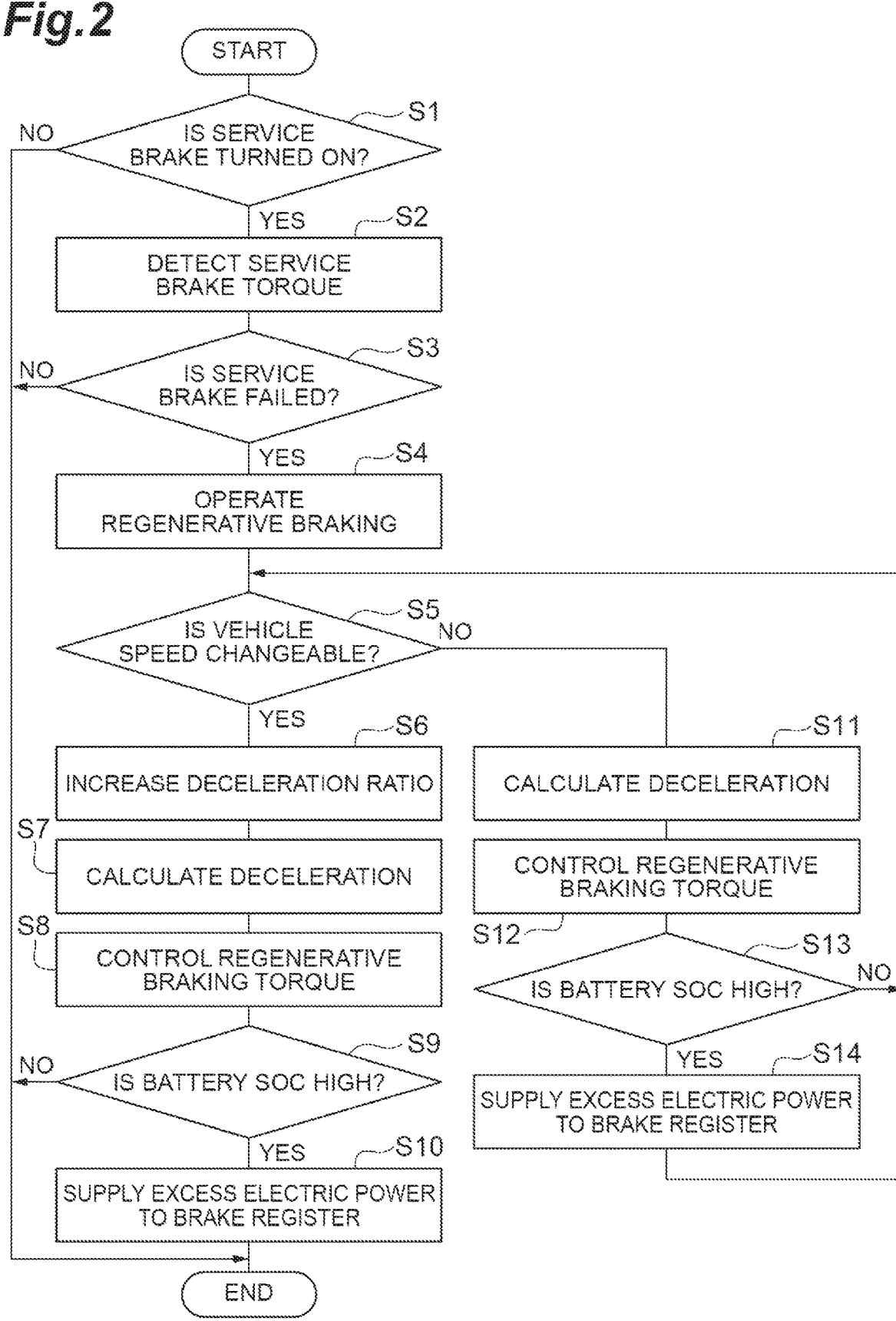

BRAKE CONTROL APPARATUS

TECHNICAL FIELD

An aspect of the disclosure relates to a brake control apparatus.

BACKGROUND

An automobile which drives drive wheels by an electric motor to which electric power is supplied from a battery and obtains a braking force by regenerative braking of the electric motor while charging the battery is proposed. For example, Japanese Unexamined Patent Publication No. 2013-207926 discloses an apparatus which operates regenerative braking when a braking force cannot be obtained by a service brake of an automobile. In the apparatus of Japanese Unexamined Patent Publication No. 2013-207926, when the regenerative braking is operated, excess electric power which cannot be charged to the battery is supplied to a load and is converted into thermal energy to be consumed.

Incidentally, in the above-described technique, a technique capable of decelerating the automobile faster by the regenerative braking is desired when the braking force cannot be obtained by the service brake.

SUMMARY

Here, an aspect of the disclosure is to provide a brake control apparatus capable of decelerating an automobile faster by regenerative braking.

An aspect of the disclosure is a brake control apparatus of an automobile that drives drive wheels by an electric motor to which electric power is supplied from a battery and obtains a braking force by regenerative braking of the electric motor while charging the battery, including: a speed change process unit configured to increase a rotation speed of the electric motor with respect to a rotation speed of the drive wheels when operating the regenerative braking.

According to this configuration, in the brake control apparatus of the automobile that drives the drive wheels by the electric motor to which electric power is supplied from the battery and obtains the braking force by the regenerative braking of the electric motor while charging the battery, since the rotation speed of the electric motor with respect to the rotation speed of the drive wheels is increased by the speed change process unit when operating the regenerative braking, the automobile can be decelerated faster by the regenerative braking.

In this case, the brake control apparatus may further include: an overcharge prevention unit configured to supply excess electric power which is not able to be charged to the battery to a load when operating the regenerative braking.

According to this configuration, since excess electric power which cannot be charged to the battery is supplied to the load by the overcharge prevention unit when operating the regenerative braking, the overcharge of the battery can be prevented.

Further, the brake control apparatus may further include: an emergency brake operation unit configured to operate the regenerative braking when the braking force is not able to be obtained by a service brake of the automobile.

According to this configuration, since the regenerative braking is operated by the emergency brake operation unit when the braking force cannot be obtained by the service brake of the automobile, the braking force can be obtained even when the service brake fails.

Further, the brake control apparatus may further include: a deceleration control unit configured to keep a deceleration of the automobile at a threshold value or lower when operating the regenerative braking.

According to this configuration, since the deceleration of the automobile is kept at the threshold value or lower by the deceleration control unit when operating the regenerative braking, the influence on the occupants of the automobile can be reduced.

According to the brake control apparatus of an aspect of the disclosure, the automobile can be decelerated faster by the regenerative braking.

BRIEF DESCRIPTION OF THE DRAWINGS

FIG. 2 is a flowchart showing an operation of the brake control apparatus according to the embodiment.

DETAILED DESCRIPTION

Figure 1:
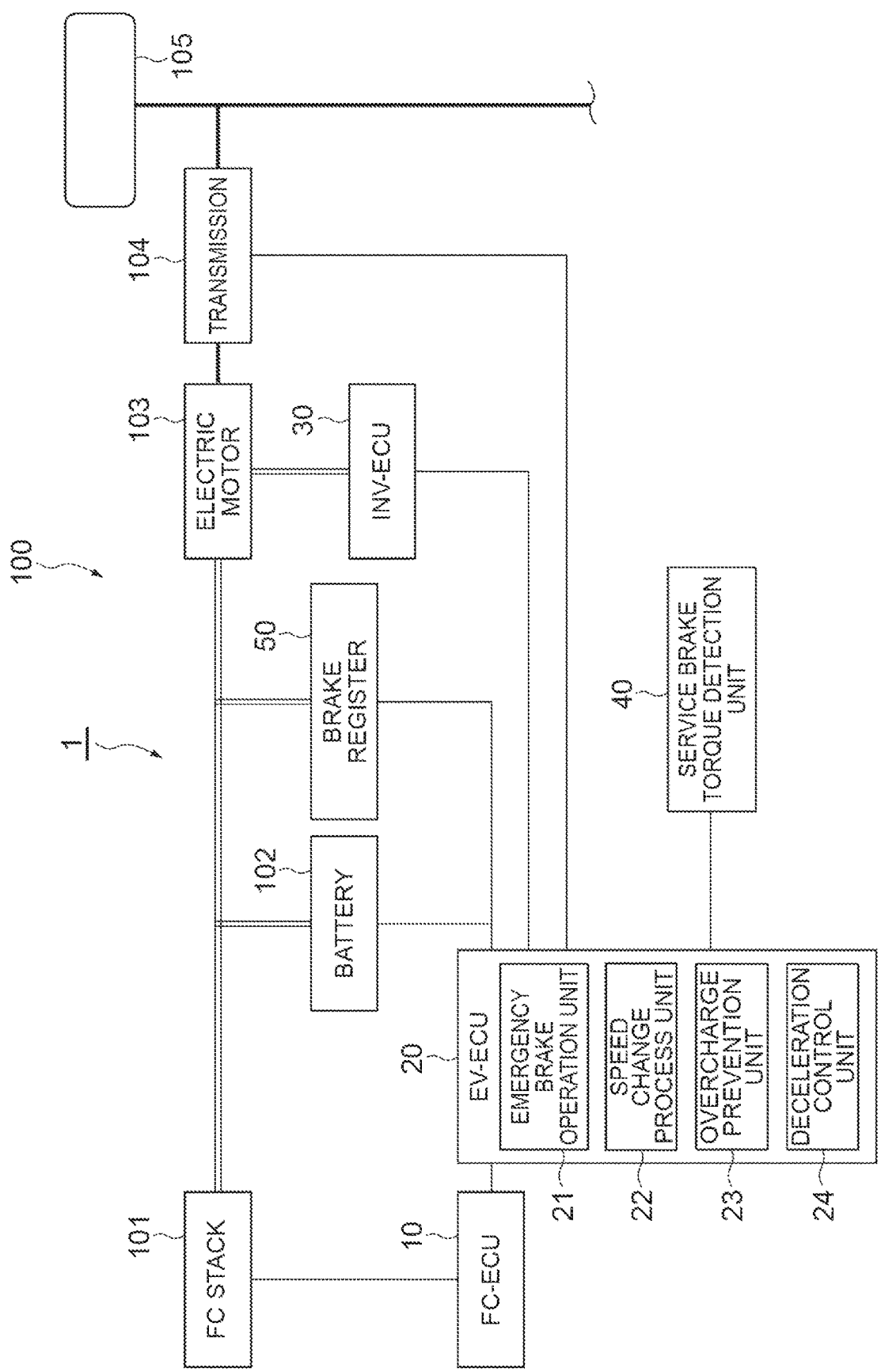
FIG. 1 is a block diagram showing a brake control apparatus according to an embodiment.

Hereinafter, a brake control apparatus according to an embodiment of the disclosure will be described in detail with reference to the drawings. A brake control apparatus 1 shown in FIG. 1 is mounted on an automobile 100 and controls a brake of the automobile 100. The automobile 100 drives drive wheels 105 by an electric motor 103 to which electric power is supplied from an FC stack 101 and a battery 102 and obtains a braking force by the regenerative braking of the electric motor 103 while charging the battery 102.

Additionally, in FIG. 1, the connection by the thin straight line of each component means the connection by a communication circuit such as CAN (Controller Area Network). In FIG. 1, the connection by the double line of each component means the connection by an electric circuit. In FIG. 1, the connection by the thick straight line of each component means the connection by a power transmission mechanism such as a power shaft.

The automobile 100 includes the FC stack 101, the battery 102, the electric motor 103, a transmission 104, and the drive wheels 105. The FC (fuel cell) stack 101 is a stack of a plurality of cells of a fuel cell that generate electric power by reacting hydrogen with oxygen in the air and supplies electric power to the electric motor 103. The transmission 104 is a mechanical device that changes the rotation speed of the drive wheels 105 with respect to the rotation speed of the electric motor 103 and the rotation speed of the electric motor 103 with respect to the rotation speed of the drive wheels 105. The transmission 104 may be a continuously variable transmission.

The brake control apparatus 1 includes an FC-ECU 10, an EV-ECU 20, an INV-ECU 30, a service brake torque detection unit 40, and a brake register 50. Each of the FC-ECU 10, the EV-ECU 20, and the INV-ECU 30 is an ECU (Electronic Control Unit) including a CPU (Central Processing Unit), a ROM (Read Only Memory), a RAM (Random Access Memory), and an HDD (Hard disk drive). The FC (fuel cell)-ECU 10 controls the operation of the FC stack 101.

The EV (Electronic Vehicle)-ECU 20 controls the running of the automobile 100 and the brake of the automobile 100. The EV-ECU 20 includes an emergency brake operation unit 21, a speed change process unit 22, an overcharge prevention unit 23, and a deceleration control unit 24. In the EV-ECU 20, the program stored in the ROM is loaded into the RAM and is executed by the CPU to control each part such as the emergency brake operation unit 21. The EV-ECU 20 may be composed of a plurality of electronic control units.

The emergency brake operation unit 21 operates the regenerative braking when the braking force cannot be obtained by the service brake of the automobile 100. The depression amount of the brake pedal of the automobile 100 and the braking force (brake torque) generated by the service brake of the automobile 100 are detected by the service brake torque detection unit 40. When the brake torque generated by the service brake is not detected by the service brake torque detection unit 40 although the depression state of the brake pedal of the automobile 100 is detected by the service brake torque detection unit 40, the emergency brake operation unit 21 operates the regenerative braking in cooperation with the speed change process unit 22, the overcharge prevention unit 23, and the deceleration control unit 24.

Additionally, the emergency brake operation unit 21 may operate the regenerative braking when the deceleration of the automobile 100 is not detected by an acceleration sensor although the depression state of the brake pedal of the automobile 100 is detected.

The speed change process unit 22 increases the rotation speed (deceleration ratio) of the electric motor 103 with respect to the rotation speed of the drive wheels 105 by transmitting a command signal to the transmission 104 when operating the regenerative braking.

The overcharge prevention unit 23 supplies excess electric power which cannot be charged to the battery 102 to the brake register (load) 50 when operating the regenerative braking. The overcharge prevention unit 23 acquires an SOC (State Of Charge) of the battery 102 from the temperature of the battery 102, the voltage of the battery 102, the integrated value of the current flowing in and out of the battery 102, and the like. The brake register 50 is an electric resistance which converts excess electric power that cannot be charged to the battery 102 into thermal energy and consumes it. Additionally, the brake register 50 may be another type of electric load capable of consuming excess electric power that cannot be charged to the battery 102.

The deceleration control unit 24 controls the braking force (brake torque) of the regenerative braking by transmitting a command signal to the INV-ECU 30 and the transmission 104 when operating the regenerative braking and keeps the deceleration of the automobile 100 at a threshold value or lower. The INV-ECU 30 controls an inverter (not shown) which converts the electric power supplied from the FC stack 101 and the battery 102 to the electric motor 103 and the electric power supplied from the electric motor 103 to the battery 102 and the brake register 50. The deceleration threshold value is set to, for example, a value of about 0.1 to 0.3 G according to the depression amount of the brake pedal.

Hereinafter, the operation of the brake control apparatus 1 of this embodiment will be described. In the following description, it is assumed that the automobile 100 is running. As shown in FIG. 2, the brake pedal of the automobile 100 is depressed and the service brake of the automobile 100 is turned on (S1). The depression amount of the brake pedal of the automobile 100 and the brake torque generated by the service brake of the automobile 100 are detected by the service brake torque detection unit 40 (S2).

When the brake torque generated by the service brake is not detected by the service brake torque detection unit 40, that is, the braking force cannot be obtained by the service brake of the automobile although the depression state of the brake pedal of the automobile 100 is detected by the service brake torque detection unit 40 (S3), the emergency brake operation unit 21 operates the regenerative braking (S4).

The speed change process unit 22 determines whether or not the automobile 100 is at a vehicle speed which can be changed by the transmission 104 using a vehicle speed sensor (not shown) when operating the regenerative braking (S5). This determination is for preventing damage to the gears and the like of the electric motor 103 when changing the vehicle speed at the unchangeable vehicle speed.

When the vehicle speed of the automobile is a changeable vehicle speed (S5), the speed change process unit 22 increases the rotation speed of the electric motor 103 with respect to the rotation speed of the drive wheels 105 by transmitting a command signal to the transmission 104 when operating the regenerative braking (S6). The deceleration control unit 24 calculates (the threshold value of) the deceleration of the automobile 100 on the basis of the depression amount of the brake pedal detected by the service brake torque detection unit 40 (S7). The deceleration control unit 24 controls the brake torque of the regenerative braking by transmitting a command signal to the INV-ECU 30 and the transmission 104 and keeps the deceleration of the automobile 100 at the threshold value or lower (S8).

When the acquired SOC of the battery 102 is almost fully charged and there is excess electric power which cannot be charged to the battery 102 (S9), the overcharge prevention unit 23 supplies excess electric power which cannot be charged to the battery 102 to the brake register 50 (S10).

On the other hand, when the vehicle speed of the automobile is an unchangeable vehicle speed (S5), the steps S11 to S14 are performed until the vehicle speed of the automobile becomes a changeable vehicle speed similarly to the above steps S7 to S10 without increasing the rotation speed of the electric motor 103 with respect to the rotation speed of the drive wheels 105 (S5). When the vehicle speed of the automobile becomes a changeable vehicle speed (S5), the above steps S7 to S10 are performed.

According to this embodiment, in the brake control apparatus 1 of the automobile 100 that drives the drive wheels 105 by the electric motor 103 to which electric power is supplied from the battery 102 and obtains the braking force by the regenerative braking of the electric motor 103 while charging the battery 102, since the rotation speed of the electric motor 103 with respect to the rotation speed of the drive wheels 105 is increased by the speed change process unit 22 when operating the regenerative braking, the automobile 100 can be decelerated faster by the regenerative braking.

Further, according to this embodiment, since excess electric power which cannot be charged to the battery 102 is supplied to the brake register 50 by the overcharge prevention unit 23 when operating the regenerative braking, the overcharge of the battery 102 can be prevented.

Further, according to this embodiment, since the regenerative braking is operated by the emergency brake operation unit 21 when the braking force cannot be obtained by the service brake of the automobile 100, the braking force can be obtained even when the service brake fails.

Further, according to this embodiment, since the deceleration of the automobile 100 is kept at the threshold value or lower by the deceleration control unit 24 when operating the regenerative braking, the influence on the occupants of the automobile 100 can be reduced.

Although the embodiment of the disclosure has been described above, the disclosure is not limited to the above embodiment and is implemented in various forms.

REFERENCE SIGNS LIST

1: brake control apparatus, 10: FC-ECU, 20: EV-ECU, 21: emergency brake operation unit, 22: speed change process unit, 23: overcharge prevention unit, 24: deceleration control unit, 30: INV-ECU, 40: service brake torque detection unit, 50: brake register (load), 100: automobile, 101: FC stack, 102: battery, 103: electric motor, 104: transmission, 105: drive wheels.

What is claimed is:

1. A brake control apparatus of an automobile that drives drive wheels by an electric motor to which electric power is supplied from a battery and obtains a braking force by regenerative braking of the electric motor while charging the battery, comprising:
    a controller including a processor configured to
        determine whether a service brake of the automobile has failed based on a brake torque generated by the service brake,
        when it is determined that the service brake of the automobile has failed,
            operate the regenerative braking,
            determine whether a vehicle speed of the automobile is changeable by a transmission of the automobile while operating the regenerative braking,
            when it is determined that the vehicle speed of the automobile is changeable by the transmission while operating the regenerative braking, increase a rotation speed of the electric motor with respect to a rotation speed of the drive wheels while operating the regenerative braking, and
            when it is determined that the vehicle speed of the automobile is not changeable by the transmission while operating the regenerative braking, operate the regenerative braking without increasing the rotation speed of the electric motor with respect to the rotation speed of the drive wheels.

2. The brake control apparatus according to claim 1, wherein the controller is further configured to supply excess electric power which is not able to be charged to the battery to a load while operating the regenerative braking.

3. The brake control apparatus according to claim 1, wherein the controller is further configured to keep a deceleration of the automobile at a threshold value or lower while operating the regenerative braking.

4. The brake control apparatus according to claim 1, wherein the automobile in an electric vehicle.

* * * * *